(12) United States Patent
Schuller

(10) Patent No.: US 10,864,898 B2
(45) Date of Patent: Dec. 15, 2020

(54) BRAKE SYSTEM FOR A MOTOR VEHICLE, AND METHOD FOR OPERATING THE BRAKE SYSTEM

(71) Applicant: Robert Bosch GmbH, Stuttgart (DE)

(72) Inventor: Wolfgang Schuller, Cleebronn (DE)

(73) Assignee: Robert Bosch GmbH, Stuttgart (DE)

( * ) Notice: Subject to any disclaimer, the term of this patent is extended or adjusted under 35 U.S.C. 154(b) by 0 days.

(21) Appl. No.: 16/071,973

(22) PCT Filed: Jan. 31, 2017

(86) PCT No.: PCT/EP2017/052022
§ 371 (c)(1),
(2) Date: Jul. 23, 2018

(87) PCT Pub. No.: WO2017/167472
PCT Pub. Date: May 10, 2017

(65) Prior Publication Data
US 2019/0031167 A1   Jan. 31, 2019

(30) Foreign Application Priority Data

Mar. 30, 2016   (DE) .......................... 10 2016 205 247

(51) Int. Cl.
*B60T 13/14* (2006.01)
*B60T 13/66* (2006.01)
(Continued)

(52) U.S. Cl.
CPC ............ *B60T 13/148* (2013.01); *B60T 7/122* (2013.01); *B60T 8/4872* (2013.01); *B60T 13/662* (2013.01); *B60T 13/686* (2013.01)

(58) Field of Classification Search
CPC .......... B60T 13/148; B60T 7/122; B60T 7/12; B60T 13/662; B60W 30/18
See application file for complete search history.

(56) References Cited

U.S. PATENT DOCUMENTS 5,375,684 A * 12/1994 Ben Asher .............. B60R 25/08
188/353
8,914,211 B2 * 12/2014 Watanabe ............. B60T 8/4872
701/70
(Continued)

FOREIGN PATENT DOCUMENTS

CN   101304909 A   11/2008
CN   103253251 A    8/2013
(Continued)

OTHER PUBLICATIONS

International Search Report corresponding to PCT Application No. PCT/EP2017/052022, dated May 4. 2017 (German and English language document) (7 pages).

*Primary Examiner* — Bradley T King
*Assistant Examiner* — James K Hsiao
(74) *Attorney, Agent, or Firm* — Maginot, Moore & Beck LLP

(57) ABSTRACT

A brake system for a motor vehicle includes a master cylinder, an actuatable switchover valve, and at least one parking brake device. The master cylinder includes at least one brake circuit which has at least one hydraulically actuatable wheel brake. The actuatable switchover valve is configured to separate and connect the brake circuit from/to the master cylinder. The parking brake device is paired with the wheel brake and configured as a hydraulically actuatable parking brake device. For this purpose, the parking brake device has a hydraulic pressure store which is configured to be operatively connected to the brake circuit. The switchover valve is configured to be closed in at least one first de-energized state in order to separate the brake circuit from the master cylinder.

9 Claims, 1 Drawing Sheet

(51) Int. Cl.
*B60T 7/12* (2006.01)
*B60T 8/48* (2006.01)
*B60T 13/68* (2006.01)

(56) References Cited

U.S. PATENT DOCUMENTS

| | | | | |
|---|---|---|---|---|
| 2002/0035832 A1* | 3/2002 | Nakamura | ............ | B60T 8/4081 60/413 |
| 2004/0011610 A1* | 1/2004 | Witzler | ................... | B60T 7/122 188/265 |
| 2011/0012421 A1* | 1/2011 | Bensch | ................ | B60T 8/1708 303/115.2 |
| 2011/0303500 A1* | 12/2011 | Hilberer | ................ | B60T 13/261 188/170 |
| 2011/0303501 A1* | 12/2011 | Hilberer | ................. | B60T 13/38 188/170 |
| 2013/0015024 A1* | 1/2013 | Vuckovic | ............. | B60T 13/385 188/170 |
| 2017/0066420 A1* | 3/2017 | Leinung | ................... | B60T 7/20 |
| 2017/0072930 A1* | 3/2017 | Leinung | ............... | B60T 13/683 |

FOREIGN PATENT DOCUMENTS

| | | |
|---|---|---|
| CN | 104837694 A | 8/2015 |
| CN | 105383474 A | 3/2016 |
| DE | 42 03 541 A1 | 6/1992 |
| DE | 10 2006 020 164 A1 | 11/2006 |
| DE | 10 2012 002 791 A1 | 8/2013 |
| DE | 10 2012 212 090 A1 | 1/2014 |
| DE | 10 2013 217 106 A1 | 3/2015 |
| DE | 10 2014 212 683 A1 | 3/2016 |
| JP | 2006-089026 A | 4/2006 |
| JP | 2007-001462 A | 1/2007 |
| WO | 02/12040 A1 | 2/2002 |

* cited by examiner

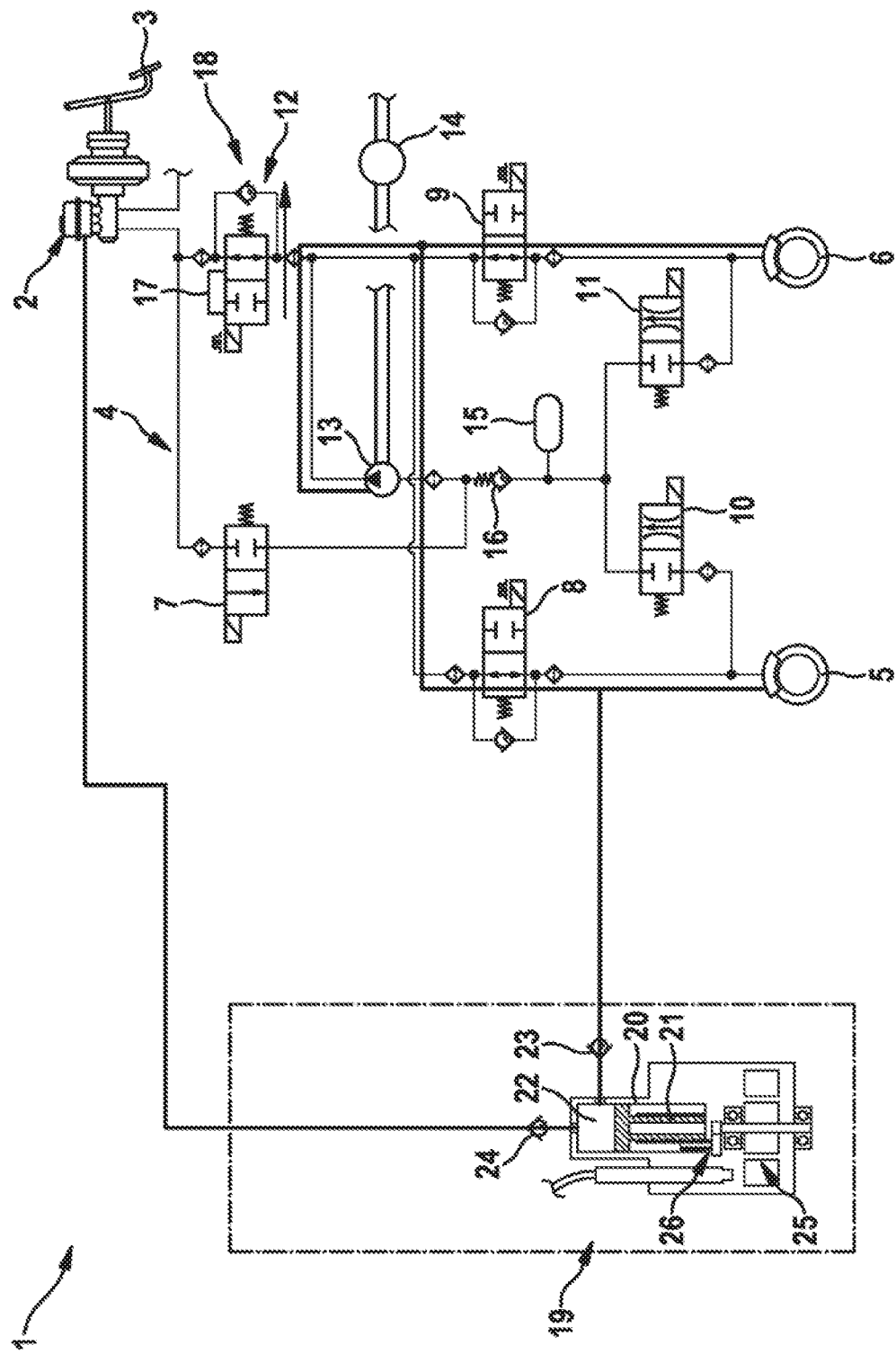

BRAKE SYSTEM FOR A MOTOR VEHICLE, AND METHOD FOR OPERATING THE BRAKE SYSTEM

This application is a 35 U.S.C. § 371 National Stage Application of PCT/EP2017/052022, filed on Jan. 31, 2017, which claims the benefit of priority to Serial No. DE 10 2016 205 247.0, filed on Mar. 30, 2016 in Germany, the disclosures of which are incorporated herein by reference in their entirety.

BACKGROUND

The disclosure concerns a brake system for a motor vehicle, with a master brake cylinder and with at least one brake circuit comprising at least one hydraulically operated wheel brake, with an actuatable switchover valve for disconnecting and connecting the brake circuit from/to the master brake cylinder and with at least one parking brake device associated with the at least one wheel brake.

Brake systems of the type mentioned above are known from the prior art. Hydraulic brake systems are regularly installed in motor vehicles, which in particular also enable individual wheel braking. Hydraulic brake systems of this type also implement functions such as an ABS program or an ESP program, which ensure the operating safety of the motor vehicle by avoiding excessive slip between the wheels of the motor vehicle and a road. For actuating a hydraulically operated wheel brake, said brake is usually hydraulically connected via a brake circuit to a master brake cylinder that can be subjected to an actuating force by a driver by operating a brake pedal. Moreover, a hydraulic brake pressure can also be adjusted by actuating a hydraulic pump in the brake circuit. The brake circuit is usually connected to the master brake cylinder by an actuatable switchover valve. This is usually embodied as a normally open switchover valve, so that in the event of a power dropout in the system, the driver can still transfer a hydraulic pressure into the brake circuit by means of the master brake cylinder by operating the brake pedal. For carrying out automatic braking procedures or for avoiding excessive brake pressure, i.e. when using an automatic safety braking program, which for example prevents reaching excessive brake pressure, the switchover valve is actuated in order to break the connection between the brake circuit and the master brake cylinder. As a result, the driver is prevented from further increasing the brake pressure in the brake circuit. Instead, the brake pressure at the wheel brake is regulated in such a way that a safer driving mode is guaranteed, for example by means of a hydraulic pressure pump and/or a plurality of switching valves.

Furthermore, it is known to provide brake systems with parking brake devices that ensure permanent maintenance of a brake pressure or a braking force, so that the vehicle can be parked on a slope and held there, for example. Up to now, substantially mechanical or electromechanical parking brake devices are used, which continue to maintain a parking brake force even when they are no longer being actuated. This is for example achieved by self-locking gearboxes, such as for example a spindle gearbox mechanically connecting an electric motor to the brake piston of a wheel brake.

SUMMARY

The brake system according to the disclosure has the advantage that the parking brake device is embodied hydraulically and in this respect is particularly advantageously integrated within the existing hydraulic system. In particular in this case, a conventional wheel brake can be used, and no particular wheel brake with integrated parking brake device must be embodied and used. Rather, the existing hydraulic system can be used and can be arranged such that the parking brake functionality is integrated in a simple and inexpensive way. According to the disclosure, it is provided for this purpose that the parking brake device is embodied as a hydraulically operated parking brake device and comprises a hydraulic storage device for this that is or can be operatively connected to the brake circuit, and that the switchover valve is embodied to be closed in at least a first normally closed state and in particular a locked state in order to separate the brake circuit from the master brake cylinder. It is also provided that the switchover valve is normally closed and in particular locked closed, at least in a first state. As a result, in the de-energized state the connection between the brake circuit and the master brake cylinder is broken, so that pressure cannot escape from the brake circuit towards the master brake cylinder. Furthermore, the parking brake device comprises a hydraulic pressure storage device that is connected to the brake circuit. The hydraulic pressure storage device provides a hydraulic pressure that also acts on the brake circuit if the switchover valve is closed. As a result, the hydraulic pressure in the brake circuit can be maintained, even if brake fluid escapes from the brake circuit in the parking brake state by leakage or leakiness. It is thereby achieved that the parking brake function can be guaranteed over a long period.

According to a preferred development of the disclosure, it is provided that the switchover valve is embodied as a bistable switchover valve that is open in a second de-energized state. The switchover valve thus comprises two de-energized states; in one de-energized state it is closed, in the other de-energized state it is open. In order to achieve the one state or the other state, the switchover valve must be actuated. Therefore, the switchover valve is also considered to be a bistable switchover valve. Advantageously, the switchover valve is open in the de-energized state and can be brought into the first or the second closed state starting from the energized state, for example by ending the actuation or by setting an excess current. As a result, it is achieved that the switchover valve also fulfills the conventional function thereof, namely that is a safety valve that also allows purely manual operation of the brake system in the event of a power dropout.

Furthermore, it is preferably provided that the switchover valve can be locked in the first de-energized state. As a result, the switchover valve can be normally locked or held in the first de-energized state, without fear of an unwanted switchover of the switchover valve occurring. The locking is advantageously carried out mechanically and can therefore be maintained permanently without expending additional force or energy.

An actuatable or automatic latching device for normal locking of the switchover valve in the first de-energized state is preferably associated with the switchover valve. The locking device can for example be a latching lug that works in conjunction with a latching recess, wherein in particular the latching lug is embodied to be elastically deformable in order to overcome the locking by applying a suitably large force. Alternatively, it is preferably provided that the locking device comprises an actively displaceable latching element, which can be displaced for example by energizing in a locked position and displacing into an unlocked position in this case, it is in particular provided that the latching element remains in the locked position, even if the locking device is no longer energized. This can for example be achieved with a spring element that, forces the latching element into the locked position.

Furthermore, it is preferably provided that the hydraulic pressure storage device comprises a cylinder in which a piston is disposed so as to be axially displaceable, wherein a hydraulic pressure chamber is formed between one end of the cylinder and the piston, and wherein the hydraulic pressure chamber is/can be connected to the brake circuit. The hydraulic pressure storage device thus essentially corresponds to a conventional pressure cylinder, so that it can be implemented inexpensively and in a space-saving manner.

The hydraulic chamber is preferably connected to the brake circuit via a non-return valve that closes towards the hydraulic chamber. Owing to the non-return valve, it is guaranteed that with the parking brake function activated, the hydraulic pressure cannot escape from the brake circuit towards the hydraulic pressure storage device.

Furthermore, it is preferably provided that the hydraulic chamber is/can be connected to a brake fluid container of the brake system. In particular, the hydraulic pressure storage device takes the brake fluid from the brake fluid container when the piston is retracted away from the end of the cylinder, so that the volume of the hydraulic chamber increases. The hydraulic pressure unit is thus embodied to suck brake fluid from the brake fluid container or master brake cylinder when required. Advantageously, the connection to the brake fluid container is also provided by a non-return valve, but this time said valve is embodied to close towards the brake fluid container, so that on setting a hydraulic parking brake pressure that acts on the brake system from the hydraulic pressure storage device, brake fluid is not fed back into the brake fluid container and the parking brake pressure is maintained in the brake circuit.

According to a preferred development of the disclosure, it is provided that an actuatable electric motor is associated with the piston of the hydraulic pressure storage device for the displacement thereof. The hydraulic pressure storage device is thus embodied electromotively, so that the pressure of the hydraulic pressure storage device can be increased or reduced as required. The hydraulic pressure storage device thus acts as an actuatable actuator for setting the parking brake pressure.

Furthermore, it is preferably provided that the brake system comprises a specially arranged control unit that switches the switchover valve into the first state to activate the parking brake device and actuates the electric motor of the hydraulic pressure storage device to maintain a parking brake pressure in the brake circuit. Initially, the parking brake pressure can be adjusted by the driver and by operating the master brake cylinder and can then be maintained by the hydraulic pressure storage device. It is also conceivable that the brake system comprises a pressure generating device, such as for example a hydraulic pump, such as in particular with a brake safety system for the automatic build-up of brake pressure, which also produces the initial parking brake pressure itself when required. Additionally or alternatively, the control unit controls the hydraulic pressure storage device in order to produce the initial parking brake pressure by the electric motor displacing the piston to reduce the volume of the hydraulic chamber.

The method according to the disclosure is characterized in that on activating a parking brake function the hydraulic storage device is actuated to at least maintain a hydraulic parking brake pressure in the brake circuit, and that the switchover valve is switched into a normally closed state. The aforementioned advantages arise as a result.

BRIEF DESCRIPTION OF THE DRAWINGS

Further advantages and preferred features arise in particular from the matters described above and from the claims. The disclosure will be discussed in detail below using an exemplary embodiment. In the FIGURE FIGURE shows a brake system of a motor vehicle in a simplified representation.

DETAILED DESCRIPTION

The single FIGURE shows in a simplified representation a brake system 1 of a motor vehicle that is not shown here in detail. The brake system 1 comprises a master brake cylinder 2 that can be operated by a brake pedal by a driver of the motor vehicle in order to comprises a hydraulic pressure in at least one brake circuit 4, which according to the present exemplary embodiment comprises two wheel brakes 5 and 6. The wheel brakes 5 and 6 are embodied as hydraulically operated wheel brakes 5,6, each comprising a brake piston that can be displaced by hydraulic pressure. Wheel brakes of this type are known in principle and will therefore not be discussed in detail at this point.

The brake circuit 4 comprises a switchover valve 7 that is connected to the master brake cylinder 2, that is embodied to be normally closed and that can be opened by being energized in order to establish a connection from the master brake cylinder 2 to the wheel brakes 5, 6. Furthermore, each wheel brake 5,6 has an associated inlet valve 8 or 9 and an outlet valve 10 or 11. The inlet valves 8, 9 are also embodied to be normally open and in said state connect the respective wheel brakes 5, 6 to the switchover valve 7 or to the master brake cylinder 2 if the switchover valve 7 or a switchover valve 12 also connecting the brake circuit 4 to the master brake cylinder 2 is open.

The brake circuit 4 further comprises a hydraulic pump that is in particular driven electromotively in order to produce a brake pressure in the brake circuit 4 electromotively. On the suction side, the hydraulic pump 13 is connected to an outlet of the switchover valve 7 or the outlet of the outlet valve 10, 11. On the pressure side, the hydraulic pump 13 is connected to the inlet valves 8, 9 and the switchover valve 12.

Furthermore, the brake circuit 4 comprises a pressure storage device 15 that is associated with the outlet valves 10, 11 and that is disposed between the outlet valves 10, 11 and a non-return valve 16 that is connected upstream of the hydraulic pump 13.

The switchover valve 12 is embodied as a normally open valve, so that in a first switching state said switchover valve 12 enables a connection from the hydraulic circuit 4 to the master brake cylinder 2. If the driver operates the brake pedal 3 in the event of a power dropout of the system, then he can still operate the wheel brakes 5, 6 hydraulically and exert a braking force. In order to carry out an automatic build-up of brake pressure, such as for example during an ESP or ABS process, the switchover valve 12 can be energized, so that in a further switching state said switchover valve 12 blocks the connection to the master brake cylinder 2, so that the driver 3 cannot produce an excessive brake pressure.

In the present case, the switchover valve 12 is embodied as a bistable switchover valve that is normally closed in a further switching state. In particular, the switchover valve 12 is embodied as a bistable solenoid valve. For this purpose, the switchover valve 12 comprises a locking device 17 that is embodied to be automatic, so that the switchover valve 12 is automatically locked in the second normally closed state and can only be brought out of said state again by renewed energization. As a result, when the brake system 1 is switched off the brake circuit 4 is isolated from the master brake cylinder 2 by the valves 7 and 12 if the switchover valve 12 has switched into the second normally closed state. As a result, a hydraulic pressure remains essentially contained within the brake circuit 4. The switchover valve 12 thus forms a component of a parking brake device 18 of the brake system 1 that is integrated within the hydraulic brake system 1.

Moreover, in order to counteract possible leaks/leakiness in the brake circuit 4, the brake system 1 comprises a hydraulic pressure storage device 19 that comprises a hydraulic piston 21 that is axially displaceable in a cylinder 20. Together with the cylinder 20, the piston 21 forms a variable volume hydraulic chamber 22 that can be fluidically connected to the brake circuit 4 on one side and to the master brake cylinder 2 on the other side. For this purpose, the hydraulic chamber 22 is associated with a first non-return valve 23 that opens towards the brake circuit 4 and that is connected to the brake circuit 4, and with a second non-return valve 24 that opens towards the hydraulic chamber 22 and that is connected to the master brake cylinder 2. The cylinder 21 can be axially displaced in the cylinder 20 by means of an electric motor 25 that is operatively connected to the piston 21 by means of a gearbox 26 in order to reduce or increase the volume of the hydraulic chamber 22 in a controlled manner. Owing to the connection to the master brake cylinder 2, the hydraulic chamber 22 can be refilled with brake fluid again as required.

The connection of the hydraulic pressure storage device 19 to the brake circuit 4 can be carried out in a different way. In particular, as shown in FIG. 1, it is provided that a hydraulic line leading from the non-return valve 23 to the brake circuit 4 is directly connected to the wheel brakes 5, 6, so that the hydraulic parking brake pressure is produced or maintained directly in the wheel brake by means of the hydraulic pressure storage device 19. Alternatively or additionally, it is provided that the hydraulic line coming from the non-return valve 23 is connected to a pressure line coming from the hydraulic pump, which in turn leads to the wheel brakes 5, 6, in particular via the valves 8, 9. As a result, the hydraulic pressure provided from the hydraulic pressure storage device 19 is introduced centrally into the brake circuit 4 and distributed to the wheel brakes 5, 6. In the case of a motor vehicle with four wheels and accordingly four wheel brakes, thus it is preferably either provided that the hydraulic pressure storage device 19 is hydraulically connected to all the wheel brakes directly, or is incorporated into the brake circuit at a point 4 upstream of the wheel brakes. To increase operating safety, both versions can also be provided.

If the parking brake device 18 is activated by the driver or user, then on the one hand the switchover valve 12 is switched to the closed position as previously described, and on the other hand the hydraulic pressure storage device 19 is actuated to set or at least to maintain a parking brake pressure in the brake circuit 4. By actuating the electric motor 25, any leak possibly occurring in the brake circuit 4 is compensated, so that the parking brake function remains available in the long term. As a result, reliable assurance of the parking brake function by means of a hydraulic parking brake system is guaranteed in a simple and inexpensive way.

In particular moreover, at least one spring element is associated with the piston 21 that subjects the piston 21 to a spring force that acts on the hydraulic piston 21 to reduce the volume of the hydraulic chamber 22, so that automatic refilling of the brake system 4 is carried out at least for a certain time without actuating the electric motor 25. Advantageously, the brake system 1 comprises a respective wheel brake 5, 6 for each wheel of the motor vehicle, for example distributed in two brake circuits corresponding to brake circuit 4, so that all four wheels or all the wheels of the motor vehicle can be subjected to a parking brake force by means of the advantageous parking brake device 18, which in particular includes the switchover valve 12 and the hydraulic pressure storage device 19. In this case, it can be provided that one hydraulic pressure storage device 19 is provided for both or more brake circuits.

It can also be alternatively provided that a dedicated hydraulic pressure storage device 19 is associated with each brake circuit.

The invention claimed is:

1. A brake system for a motor vehicle, comprising:
a master brake cylinder with at least one brake circuit comprising at least one hydraulically operated wheel brake, the master brake cylinder configured to generate a hydraulic pressure for activating the at least one wheel brake through the brake circuit;
a first actuatable switchover valve configured to disconnect and connect the brake circuit from/to the master brake cylinder;
at least one parking brake device associated with the at least one wheel brake, the at least one parking brake device (i) including a second actuatable switchover valve configured to disconnect and connect the brake circuit from/to the master brake cylinder, (ii) a locking device mounted on the second actuatable switchover valve, and (iii) a hydraulic pressure storage device configured to be operatively connected to the brake circuit; and
a control unit configured to activate the at least one parking brake device and to deactivate the at least one parking brake device,
wherein the first switchover valve is configured as a bistable switchover valve that is closed in a first de-energized state in order to disconnect the brake circuit from the master brake cylinder and open in a second de-energized state in which the brake circuit is connected to the master brake cylinder,
wherein the second switchover valve is normally open in a first de-energized state in order to connect the brake circuit to the master brake cylinder and is configurable in a closed position in an energized state in order to disconnect the brake circuit from the master brake cylinder,
wherein the locking device is configured to lock the second switchover valve in the closed position,
wherein the control unit is configured to activate the at least one parking brake by closing the first switchover valve and locking the second switchover in the closed position with the locking device to isolate the brake circuit from the master brake cylinder and to contain the hydraulic pressure generated by the master brake cylinder within the brake circuit,
wherein the contained hydraulic pressure acts on the at least one hydraulically operated wheel brake to maintain the motor vehicle in a braked position, and
wherein in response to a leak of the contained hydraulic pressure from the brake circuit, the control unit is further configured to supply the brake circuit with pressure from the hydraulic pressure storage device to maintain the motor vehicle in the braked position.

2. The brake system as claimed in claim 1, wherein the hydraulic pressure storage device comprises a cylinder in which a piston is disposed to be axially displaceable, wherein a hydraulic pressure chamber is formed between one end of the cylinder and the piston, and wherein the hydraulic pressure chamber is configured to be connected to the brake circuit.

3. The brake system as claimed in claim 2, wherein the hydraulic pressure chamber is connected to the brake circuit via at least one non-return valve that closes towards the hydraulic pressure chamber.

4. The brake system as claimed in claim 2, wherein the hydraulic pressure chamber is configured to be connected to a brake fluid container of the brake system.

5. The brake system as claimed in claim 2, further comprising an actuatable electric motor configured to displace the piston.

6. The brake system as claimed in claim 5, wherein the control unit is configured to actuate the electric motor of the hydraulic pressure storage device to at least maintain the contained hydraulic pressure in the brake circuit.

7. The brake system as claimed in claim 1, wherein:
the locking device includes an actively displaceable latching element movable to a locked position upon being energized and an unlocked position,
the latching element in the locked position locks the second switchover valve in the closed position, and
the latching element remains in the locked position when the locking device is no longer energized.

8. The brake system as claimed in claim 7, wherein a spring element forces the latching element into the locked position.

9. A method for operating a brake system for a motor vehicle, the brake system including a master brake cylinder and at least one brake circuit with at least one hydraulically operated wheel brake, and an actuatable switchover valve configured to disconnect and connect the brake circuit from/to the master brake cylinder, and at least one parking brake device associated with the at least one wheel brake, the method comprising:
generating a brake pressure with the master brake cylinder in the at least one brake circuit for activating the at least one wheel brake;
on activating the parking brake device, switching the switchover valve to a closed state to disconnect the master brake cylinder from the at least one brake circuit and to contain the brake pressure generated by the master brake cylinder in the at least one brake circuit for maintaining the motor vehicle in a braked position;
locking mechanically the switched switchover valve in the closed state with a locking device of the switchover valve; and
counteracting a leakage of the contained brake pressure from the at least one brake circuit by actuating a hydraulic pressure storage device to generate additional hydraulic pressure in the brake circuit.

\* \* \* \* \*

UNITED STATES PATENT AND TRADEMARK OFFICE
CERTIFICATE OF CORRECTION

PATENT NO. : 10,864,898 B2
APPLICATION NO. : 16/071973
DATED : December 15, 2020
INVENTOR(S) : Schuller Page 1 of 1

It is certified that error appears in the above-identified patent and that said Letters Patent is hereby corrected as shown below:

In the Claims

In Claim 1, at Column 6, Lines 58-59:
"the second switchover in the closed position"
Should read:
--the second switchover valve in the closed position--.

Signed and Sealed this
Sixth Day of April, 2021

Drew Hirshfeld
*Performing the Functions and Duties of the*
*Under Secretary of Commerce for Intellectual Property and*
*Director of the United States Patent and Trademark Office*